United States Patent [19]
Sullivan et al.

[11] Patent Number: 5,542,314
[45] Date of Patent: Aug. 6, 1996

[54] COMPUTER SUPPORTS

[75] Inventors: Dan E. Sullivan, Snohomish; Peter B. Hetterle, Kirkland, both of Wash.

[73] Assignee: M.K. Manufacturing Incorporated, Kirkland, Wash.

[21] Appl. No.: 110,304

[22] Filed: Aug. 20, 1993

[51] Int. Cl.⁶ .................... H03K 7/18; B60R 11/02
[52] U.S. Cl. .................... 74/552; 211/181; 211/119; 224/276; 248/918; 361/683
[58] Field of Search .................... 108/44; 224/276; 248/918; D12/177; 211/181, 42, 119; 40/606; 74/552; 361/683

[56] References Cited

U.S. PATENT DOCUMENTS

| | | | |
|---|---|---|---|
| 904,080 | 11/1908 | Orin | 211/181 |
| 2,314,550 | 3/1943 | Olman | 108/44 |
| 4,117,936 | 10/1978 | Dawson | 211/181 |
| 4,269,381 | 5/1981 | Harms | 211/181 |
| 5,177,665 | 1/1993 | Frank et al. | 361/683 |

*Primary Examiner*—Rodney H. Bonck
*Assistant Examiner*—Sherry Estremsky
*Attorney, Agent, or Firm*—Hughes, Multer & Schacht P.S.

[57] ABSTRACT

Skeletal computer support devices which have: (a) rigid side rails against which the data processing unit of the computer rests, (b) rests at the lower ends of the side rails on which the data processing unit is seated, and (c) hooks at the upper ends of the side rails for connecting the device in an easy to affix and remove fashion to a vehicular steering wheel with the computer keyboard readily accessible to, and comfortable to use by, an occupant of the vehicle. Upper and lower crosspieces integrate the side rails into a rigid inflexible structure. Restraints at the ends of the lower crosspiece keep the computer from shifting from side-to-side while it is being used.

7 Claims, 4 Drawing Sheets

COMPUTER SUPPORTS

TECHNICAL FIELD OF THE INVENTION

The present invention relates to computer supports and, more particularly, to novel, improved devices for supporting a portable computer from a vehicular steering wheel.

BACKGROUND OF THE INVENTION

Corporations, other organizations, and individuals are spending millions of dollars on powerful and compact portable computers to increase productivity. The user usually carries his or her computer during the workday to access pre-call records, set post-call follow-ups, and log information while it is still fresh in the user's mind.

Ninety per cent of the time, the user attempts these activities while parked in a vehicle, either before or immediately following an activity with a sales presentation being typical. It does not take long for the user to realize there is no convenient way to utilize a computer in a parked vehicle. There is no room for a computer on a dashboard; and the keyboard is virtually inaccessible if the computer is held on the user's lap, even on the passenger side of the vehicle. The resourceful user typically places the computer on the passenger seat, awkwardly rotates his or her upper body 90 degrees to the right, and attempts to log and retrieve data while in this most uncomfortable position. That increases stress and fatigue and may even decrease productivity. The result is that a typically unacceptable number of users leave the computer home, jotting down notes throughout the day and then entering them into their computers upon arriving home in the evening. The result is a duplication of effort, a waste of money, and under as well as ineffective utilization of an expensive high tech device that is supposed to increase productivity.

This problem of making a portable computer acceptably easy to use in a vehicular setting is addressed in U.S. Pat. No. 5,177,665 issued 5 Jan. 1993 to Frank et al. The patented solution to the problem is a multipart housing/support which has the disadvantage of employing moving parts. The patented device is also lacking in that its sheet material construction is apt to provide a wobbly support. Furthermore, the sheet material hooks employed in the patented device will assuredly not provide a secure connection between the device and a steering wheel. These relatively flimsy components could easily be broken, bent, or otherwise damaged in a manner which would result in an insecure connection between the computer supporting device and the vehicular steering wheel.

Thus, there is an existing and continuing need for a device that can be used to support a portable computer from a vehicular steering wheel in a manner which makes the computer easy to use by an occupant of the vehicle.

SUMMARY OF THE INVENTION

Novel, improved devices which are designed to support a portable computer from a vehicular steering wheel and which do not have drawbacks such as those enumerated above have now been invented and disclosed herein.

Briefly, these novel computer support devices are of skeletal construction and have: (a) rigid side rails against which the data processing unit of the computer rests, (b) components at the lower ends of the side rails on which the data processing unit is seated, and (c) components such as integral hooks at the upper ends of the side rails. These hooks connect the device in an easy to affix and remove fashion to a vehicular steering wheel with the keyboard readily accessible to, and comfortable to use by, an occupant of the vehicle.

Upper and lower crosspieces extend between the side rails and integrate the side rails into a rigid, inflexible structure. Restraints at the ends of the lower crosspiece keep the computer from shifting from side-to-side while it is being used.

Preferred embodiments of the invention have a panel extending between and fixed at upper and lower edges to the crosspieces of the device. Corporate logos and other information can be displayed on this panel. The panel may also add significant rigidity to the unitary, computer support device.

The computer support device may also include elongated, rigid standards which are located on the back or steering wheel-facing side of the computer support device and are fixed to the side rails of the device. Segments of these standards spaced from the side rails engage the rim of the steering wheel to which the support device is connected and tilt the support device to a less perpendicular orientation. This may make the supported computer easier to operate, particularly in vehicles which are not equipped with a tilt steering wheel. The standards can also be employed to add rigidity to the computer support device.

It will be appreciated by the reader from the foregoing brief description of the invention that it is free of moving parts and that is composed entirely of durable components so assembled as to provide a rigid platform which will not wobble or otherwise allow a supported computer to shift during operation of the computer.

Portable computer supports embodying the principles of the present invention are simple, relatively inexpensive to manufacture, easy to use, and attractive. They are versatile in that a variety of portable computers can be accommodated and in that they can also be employed as appropriate to temporarily support notebooks, writing pads, books, and other artifacts.

The advantages, important features, and objects of the invention will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
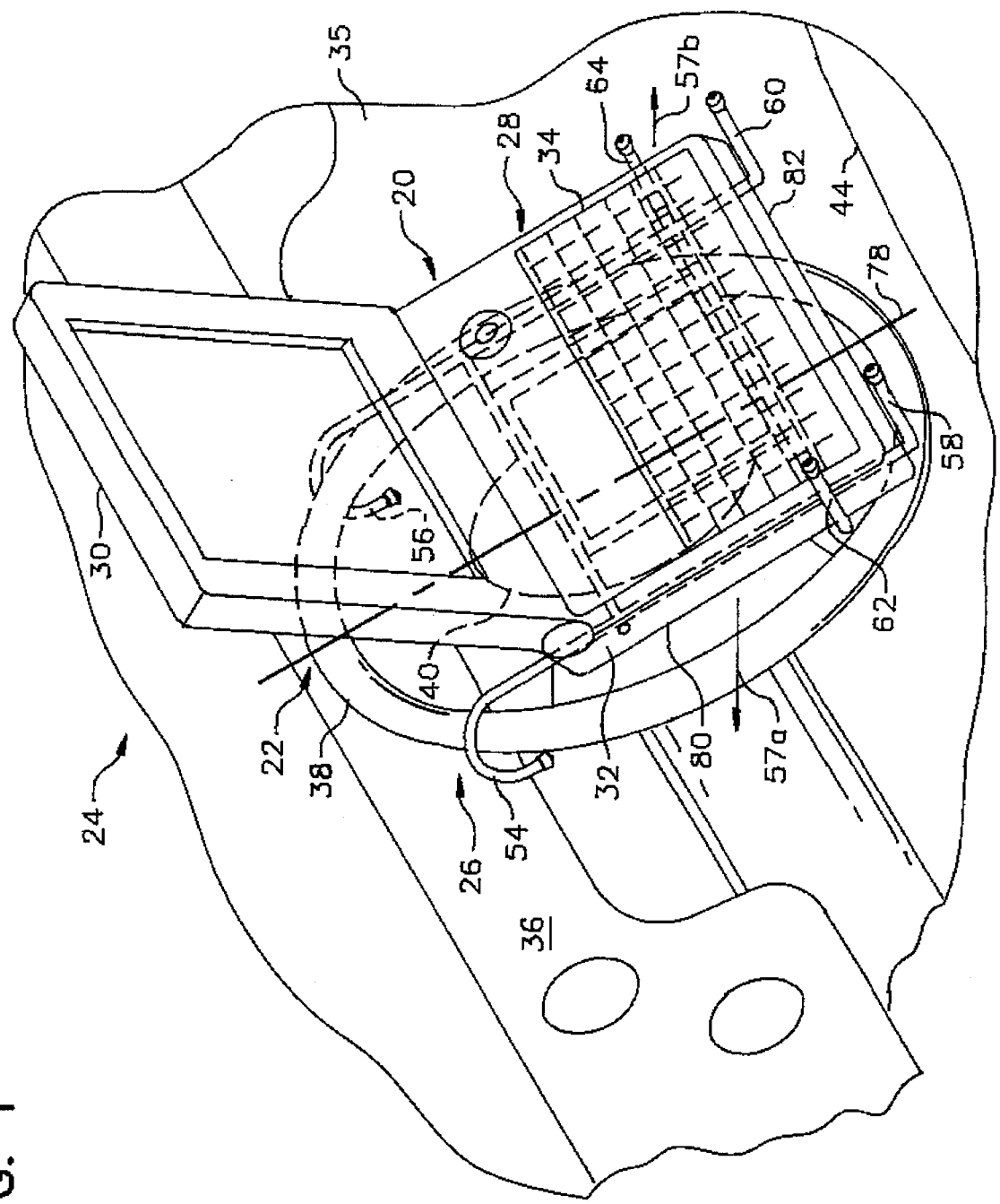
FIG. 1 is a generally pictorial view of a portable computer supported in a user accessible orientation from a vehicular steering wheel by a computer support device embodying the principles of the present invention.

Referring now to the drawing, FIG. 1 depicts a portable computer 20. That computer is supported from the steering wheel 22 of a vehicle 24 by a skeletal computer support device 26 embodying the principles of the present invention.

This makes the computer easy and comfortable to use by an occupant of vehicle 24.

Portable computer 20 is of conventional construction. Its major components are a data processing unit 28 and a flip-up screen 30. Data processing unit 28 includes a casing 32 which supports a keyboard 34 and houses the customary central processing unit, ancillary components, and power supply, none of which are of significance as far as the present invention is concerned and none of which have consequently been illustrated in the drawings. Computers of the type which device 26 is designed to support are available from IBM, Compaq, and a host of other manufacturers.

The vehicle 24 illustrated in FIG. 1 has a cabin 35 bounded at its forward end by a dashboard 36. Steering wheel 22, which has a rim 38 and a hub 40, is supported in a generally vertical orientation by a steering wheel column 42 (see FIG. 4). The driver's seat is shown in fragmentary form in FIG. 1 and identified by reference character 44.

Figure 2:
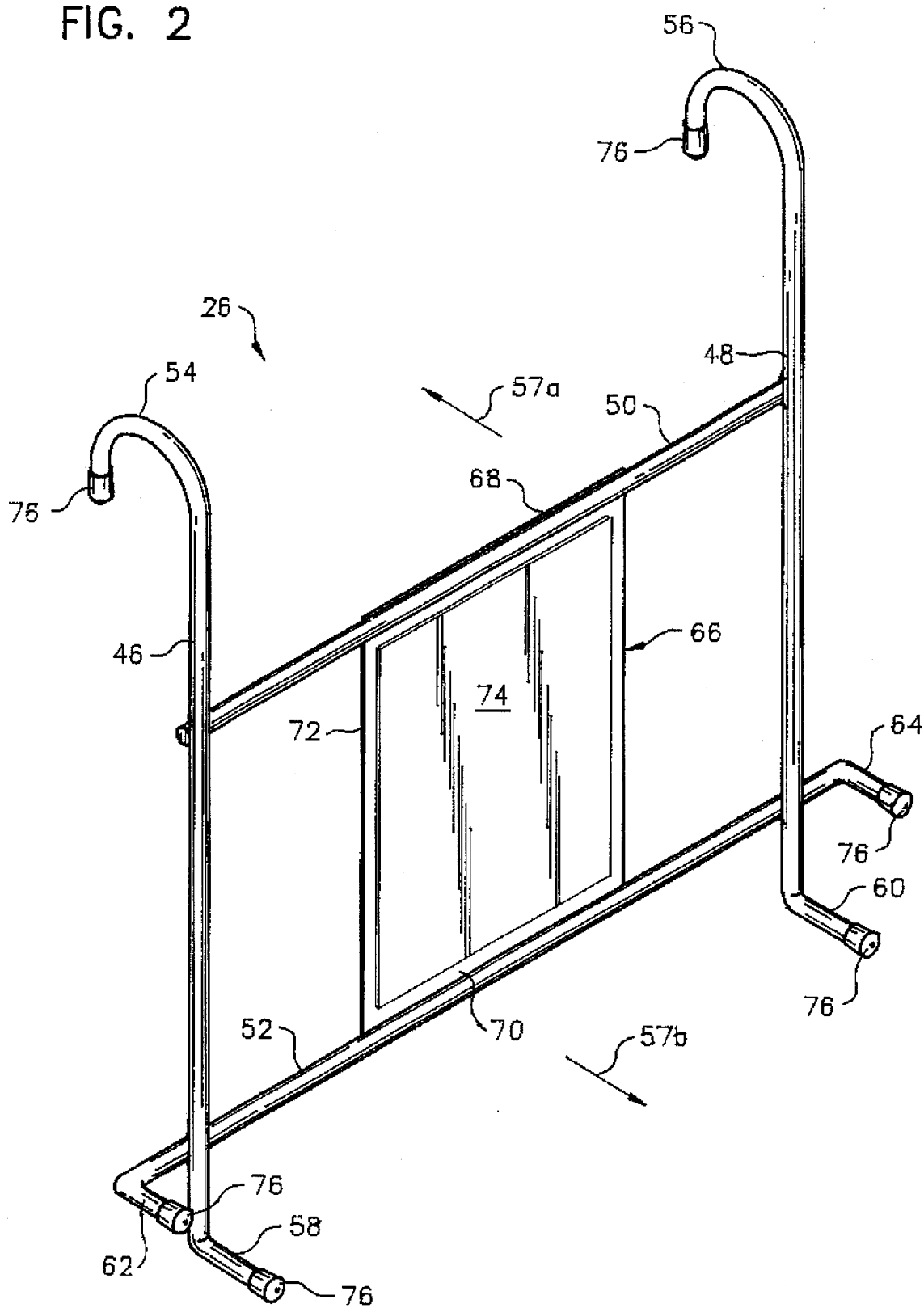
FIG. 2 is a perspective view of the computer support device.

Referring still to FIG. 1 but more particularly to FIG. 2, computer support device 26 has first and second uprights or side rails 46 and 48 which are maintained in the illustrated, parallel, spaced apart relationship by first and second, laterally extending, upper and lower crosspieces 50 and 52. Both the side rails and crosspieces are fabricated from a rigid stock material such as a circularly sectioned rod and so bonded together as to generate a unitary, rigid structure which is not susceptible to wobbling or warping or other types of distortion.

The upper ends of side rails 46 and 48 are bent into arcuate loops or hooks 54 and 56 which face the steering wheel or back side of device 26 indicated by arrow 57a in FIG. 1. Hooks 54 and 56 are employed to removably affix the device to steering wheel 22.

The lower ends of the side rails 46 and 48 are bent at right angles and toward the front or driver-facing side of computer support device 26 indicated by arrow 57b in FIG. 1. This provides rests 58 and 60 for data processing unit 28 of portable computer 20.

The ends of the lower crosspiece 52 are similarly bent at right angles to face the seat 44 of vehicle 24. This provides lateral restraints 62 and 64. The lateral restraints are engageable by the computer's data processing unit 28 to keep computer 20 from shifting from side-to-side while it is being operated.

The final major component of computer support device 26 is a centrally and symmetrically located, rectangular panel 66. That panel extends between and is fixed at its upper and lower edges 68 and 70 to the upper and lower crosspieces 50 and 52 of the computer support device. Panel 66 is composed of a sheet material backing 72 and a placard 74, also of sheet construction. Corporate names and logos and other information can be printed, engraved, or otherwise placed on placard 74, making the desired information readily noticeable by a user of computer support device 26. Panel 66 also has the advantage of adding stiffness and rigidity to computer support device 26.

Buffers 76 of a synthetic rubber or other elastically deformable material are installed on the ends of hooks 54 and 56, rests 58 and 60, and lateral restraints 62 and 64. These keep the ends of the just-enumerated components from scratching or otherwise marring objects with which they come in contact and from scratching, cutting, or otherwise injuring the users of the computer support device.

Computer support device 26 is employed only after the ignition of vehicle 24 is turned off and steering wheel 22 is locked. Hooks 54 and 56 are then placed over the rim 30 of steering wheel 22 with the hooks: (a) symmetrically located on opposite side of the vertical line of symmetry 78 of steering wheel 22, and (b) facing the dashboard 36 of vehicle 24 and the lower part of the support device resting on a lower part of steering wheel 22 to support the device 26 in the vertically inclined orientation illustrated in FIG. 1. Computer 20 is then placed on support 26 with the back side 80 of its data processing unit 28 resting on support device side rails 46 and 48 and the lower edge 82 of that unit seated on the rests 58 and 60 at the lower ends of side rails 46 and 48.

Steering wheel 22 may then be tilted to a position optimizing the use of keyboard 34 by the person employing portable computer 20 if the vehicle has a tile-type steering wheel; and screen 30 is flipped up to the position affording greatest visibility to the user of the computer.

Once the user is finished with computer 20, screen 30 is returned to its closed position; and computer 20 is lifted off computer support device 26 and put away. Finally, support device 26 is removed from steering wheel 22 and securely stowed in a safe place.

Figure 3:
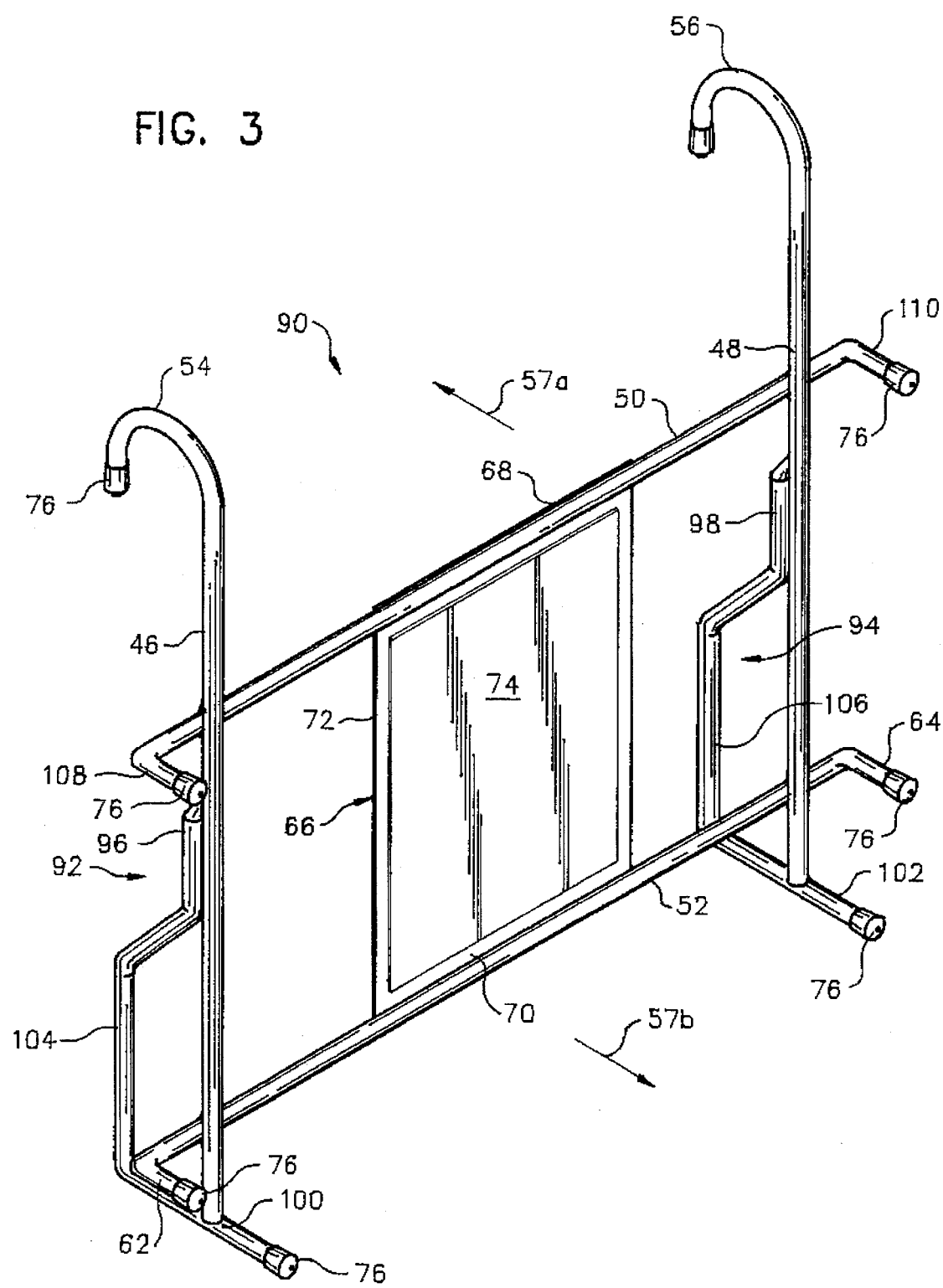
FIG. 3 is a view similar to FIG. 2 of a second embodiment of the invention.
Figure 4:
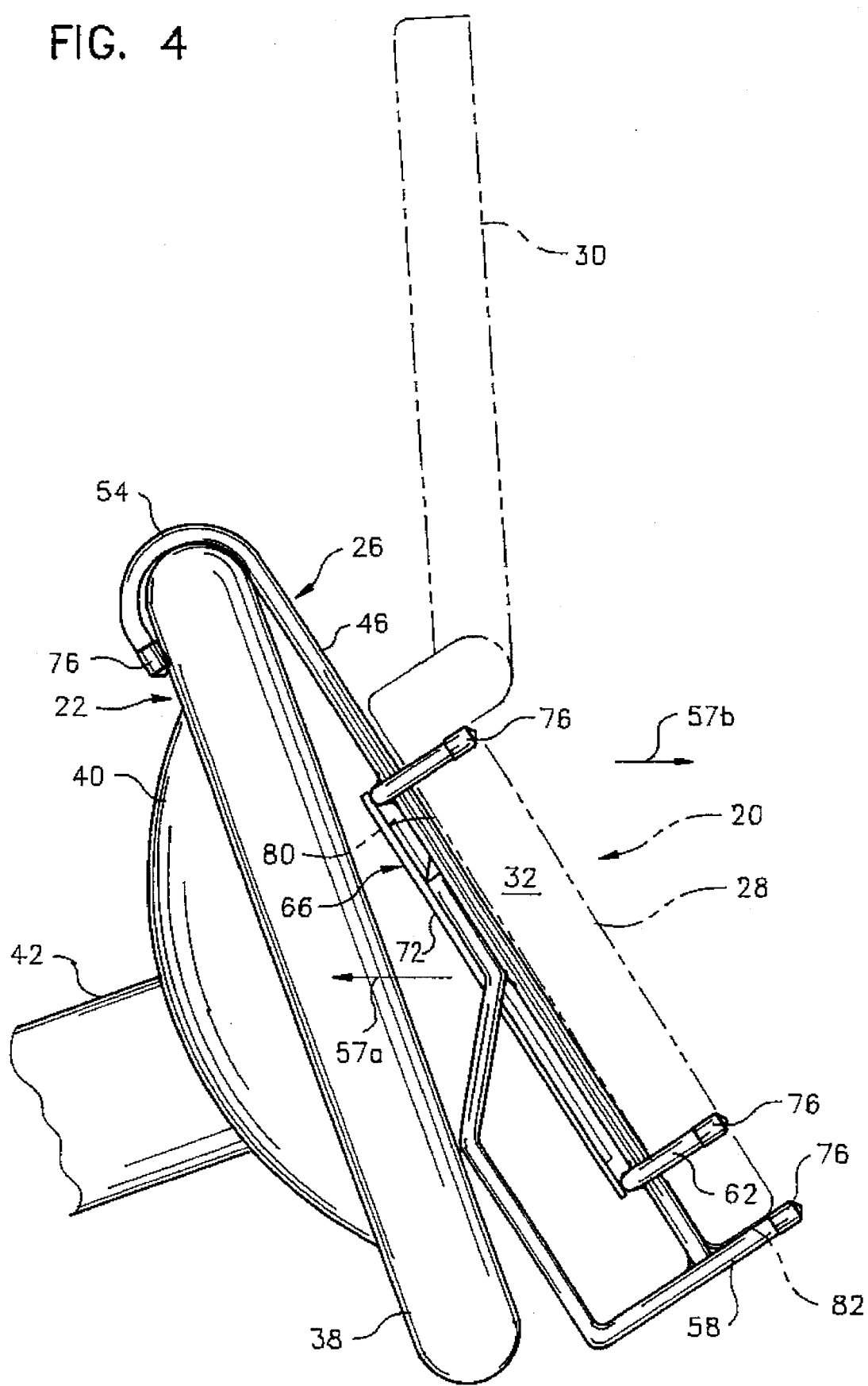
FIG. 4 is a view showing how the FIG. 3 device is used to support a portable computer from a vehicular steering wheel.

A second skeletal computer support device embodying the principles of the present invention is illustrated in FIGS. 3 and 4. The support device is identified in those figures by reference character 90.

To a significant extent, computer support devices 26 and 90 have components which are alike. The same reference characters are utilized herein to identify those components of the two support devices.

In one respect, computer support device 90 differs from its counterpart 26 in that it includes elongated, left and right standards identified in FIGS. 3 and 4 by reference characters 92 and 94. These components are also formed from rigid, circularly sectioned rods.

The upper end segments 96 and 98 of standards 92 and 94 are bonded in any appropriate fashion to side rails 46 and 48 with the standards facing rearwardly; i.e., toward steering wheel 22. Standards 92 and 94 also have integral, normally extending segments 100 and 102 at their lower ends. These elements of standards 92 and 94 face forwardly—i.e., toward vehicle seat 44 when computer support device 90 is assembled to steering wheel 22. Intermediate segments 104 and 106 of standards 92 and 94 are spaced rearwardly from side rails 46 and 48. With computer support device 90 installed on steering wheel 22, these intermediate segments 104 and 106 engage the lower part of steering wheel rim 22, increasing the angle between the vertical and the supported portable computer 20. This can make portable computer 20 easier to use, particularly if steering wheel 22 is not of the tilt type.

In the FIGS. 3 and 4 embodiment of the invention, the lower ends of side rails 46 and 48 are bonded to the computer rest-forming segments 100 and 102 of standards 92 and 94 to rigidify the computer support device 90 rather than being terminated in computer rests as they are in computer support device 26.

Finally, support device 90 differs from its counterpart 26 in that forwardly extending lateral restraints 108 and 110 are formed by bending the end segments of upper crosspiece 50 at ninety degree angles to face in the forward (arrow 57b) direction. Restraints 108 and 110 are also engageable by the data processing unit 28 of computer 20 to keep the computer from shifting from side-to-side during operation.

Protective stops 76 are installed on the exposed, forwardly facing ends of these upper restraints 108 and 110.

As is apparent from FIG. 4, computer support device 90 is installed, employed, and removed in precisely the same manner as its counterpart 26. Installed, one primary difference—alluded to above—is that the intermediate segments 104 and 106 of standards 92 and 94 decrease the perpendicularity of the support, in many cases facilitating the operation of portable computer 20. Also, the restraints on both lower crosspiece 52 and upper crosspiece 50 keep computer 20 from shifting laterally during use.

The invention may be embodied many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. The combination of:

a vehicular steering wheel with an annular rim, a portable computer comprising a data processing unit, and a skeletal frame which is free of movable parts for supporting said computer in substantially overlying relationship with said steering wheel, said computer supporting frame resting on said steering wheel and comprising:

first and second, elongated, side rails;

first and second, spaced apart crosspieces maintaining said side rails in parallel, spaced apart relationship, said crosspieces cooperating with said rails to provide a rigid, unitary structure;

support means at corresponding first ends of each of said side rails for engaging circumferentially spaced peripheral portions of the steering wheel to enable removably affixing said frame to said steering wheel with the frame in an inclined orientation relative to a vertical plane and resting on respective opposed, circumferentially spaced peripheral portions of the steering wheel;

computer supporting rests extending outwardly relative to a plane defined by said steering wheel and adjacent corresponding second ends of said side rails, the data processing unit of said portable computer having a back side resting on said side rails and a lower edge seated on said computer supporting rests; and lateral restraints at first and second, laterally spaced ends of one of said crosspieces which are engageable by the portable computer data processing unit to limit side-to-side movement of the portable computer when it is positioned on the frame.

2. A combination as defined in claim 1 in which the device for supporting the portable computer comprises:

first and second, elongated, steering wheel engageable standards fixed in a one-to-one relationship and in like orientations to the first and second side rails;

the computer supporting rests at the second ends of said side rails being integral components of said standards.

3. A combination as defined in claim 2 in which the computer supporting rests are fixed in a one-to-one relationship to said second ends of said side rails.

4. A combination as defined in claim 1 which comprises first and second, elongated standards fixed in a one-to-one relationship and in like orientation to the first and second side rails, said standards having integral, steering wheel-engaging segments that are spaced from said side rails and so orient the device at an angle to said steering wheel as to decrease the perpendicularity of and thereby facilitate the use of the portable computer.

5. A combination as defined in claim 1 in which there are restraints at first and second, laterally spaced ends of the other of said crosspieces which are engageable by the portable computer data processing unit to prevent side-to-side movement of the portable computer.

6. A combination as defined in claim 1 which has a display panel extending from one to the other of and fixed to said crosspieces.

7. A combination as defined is claim 1 in which the side rails and crosspieces are fabricated from rigid, circularly sectioned rods.

* * * * *